US007461981B2

(12) United States Patent
Yow, Jr. et al.

(10) Patent No.: US 7,461,981 B2
(45) Date of Patent: Dec. 9, 2008

(54) FURCATION TUBING AND FANOUT FURCATION KIT

(75) Inventors: Charles A. Yow, Jr., Fort Worth, TX (US); Daniel Leyva, Jr., Arlington, TX (US); Terry Lee Cooke, Hickory, NC (US); John Bradley Johnson, Taylorsville, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/636,259

(22) Filed: Dec. 8, 2006

(65) Prior Publication Data

US 2008/0138026 A1 Jun. 12, 2008

(51) Int. Cl.
*G02B 6/36* (2006.01)
(52) U.S. Cl. .......................................... 385/76; 385/92
(58) Field of Classification Search ................. 385/76, 385/92
See application file for complete search history.

(56) References Cited

U.S. PATENT DOCUMENTS

| | | | | | |
|---|---|---|---|---|---|
| 4,119,362 | A | * | 10/1978 | Holzman | 385/74 |
| 4,645,295 | A | * | 2/1987 | Pronovost | 385/55 |
| 4,783,137 | A | * | 11/1988 | Kosman et al. | 385/53 |
| 5,024,505 | A | * | 6/1991 | Fujikawa et al. | 385/97 |
| 5,994,679 | A | * | 11/1999 | DeVeau et al. | 219/530 |
| 6,498,882 | B1 | * | 12/2002 | Buckelew et al. | 385/114 |
| 6,816,663 | B2 | * | 11/2004 | Daoud | 385/136 |
| 6,829,424 | B1 | * | 12/2004 | Finzel et al. | 385/135 |
| 7,121,732 | B2 | * | 10/2006 | Pimpinella et al. | 385/53 |
| 7,260,299 | B1 | * | 8/2007 | Di Teodoro et al. | 385/123 |
| 2003/0072537 | A1 | * | 4/2003 | Eichenberger et al. | 385/89 |
| 2004/0197066 | A1 | * | 10/2004 | Daoud | 385/136 |

OTHER PUBLICATIONS

Corning Cable Systems Product Specifications Sheet "Buffer Tube Fan-Out Kits, A LANscape® Solutions Product", 2 pages, Jun. 2005.
Corning Cable Systems Product Specifications Sheet "Single-Tube Cable Fan-Out Kits, A LANscape® Solutions Product", 2 pages, Jun. 2005.
Corning Cable Systems Product Specifications Sheet "Spider Fan-Out Kits, A LANscape® SolutionsProduct", 2 pages, Jun. 2005.
Corning Cable Systems Product Specifications Sheet "Ribbon Cable Spider Fan-Out Kits, A LANscape® Solutions Product", 2 pages, Jun. 2005.
Corning Cable Systems Product Specifications Sheet "Ribbon Fan-Out Kits, A LANscape® Soluctions Product", 2 pages, Jun. 2005.

* cited by examiner

*Primary Examiner*—K. Cyrus Kianni (57) ABSTRACT

Furcation tubing is made of glass-filled Teflon (PTFE) that provides reduced longitudinal shrinkage and increased tensile bond strength in the standard colors utilized for fiber identification. The furcation tubing experiences no more longitudinal shrinkage than furcation tubing made of polyvinylidene fluoride (PVDF) and has a tensile bond strength no less than furcation tubing made of clear, etched Teflon (PTFE). A fanout furcation kit prevents movement of the separated optical fibers in a funnel area of a lower furcation body. The funnel area is bathtub shaped with an increasing depth in the direction of an insert block having at least two rows of passageways in a staggered array. Guide walls defining the funnel area form a seal with an upper furcation body. Use of the furcation tubing and fanout furcation kit significantly reduces unacceptable attenuation and micro-damage to optical fibers deployed in an outdoor fiber optic network.

7 Claims, 10 Drawing Sheets

FURCATION TUBING AND FANOUT FURCATION KIT

BACKGROUND OF THE INVENTION

1. Field of the Invention

The present invention relates generally to furcation tubing for transitioning a multi-fiber optical cable into individual optical fibers, and to a fanout furcation kit for separating the optical fibers of a multi-fiber optical cable into individual optical fibers and protecting the optical fibers at the separation location.

2. Description of the Related Art

Furcation tubing is used throughout fiber optic networks to transition multi-fiber optical cables into individual optical fibers. The individual optical fibers are typically separated from the multi-fiber optical cable using a fanout furcation kit and terminated to a fiber optic connector or optical device, such as optical switching or cross-connecting equipment. The two most common materials currently being used in fiber optic networks for furcation tubing are polyvinylidene fluoride (PVDF) and clear, etched polytetrafluoroethylene (PTFE), commonly known as Teflon. Although each of these materials provides certain advantages, both have one or more undesirable characteristics when used in conjunction with fanout furcation kits and fiber optic connectors or optical devices.

PVDF is readily available in the twelve standard colors utilized in the telecommunications industry for fiber identification and provides acceptable tensile bond strength when secured to a fanout furcation kit, fiber optic connector or optical device using a conventional epoxy adhesive. PVDF furcation tubing, however, experiences excessive longitudinal shrinkage when exposed to the extreme temperatures and/or temperature cycling encountered in some outdoor installations. Excessive shrinkage can cause unacceptable attenuation (i.e., transmission loss) due to micro-bending of the optical fibers within the furcation tubing and movement of the optical fibers within the fanout furcation kit, fiber optic connector or optical device. As a result, PVDF furcation tubing must be pre-conditioned during manufacture to minimize the amount of longitudinal shrinkage that occurs with exposure to extreme temperatures and temperature cycling. In some instances, however, factory pre-conditioning has been insufficient to prevent unacceptable attenuation and micro-damage to optical fibers in fanout furcation kits deployed in some outdoor installations.

Clear, etched PTFE furcation tubing provides a more favorable coefficient of thermal expansion (CTE), and therefore, considerable less longitudinal shrinkage in extreme temperatures and/or temperature cycling. PTFE furcation tubing, however, has certain other undesirable characteristics for use with fanout furcation kits and fiber optic connectors or optical devices. Even though the PTFE tubing can be chemically etched to enhance bonding, greater tensile bond strength is oftentimes required when used in fanout furcation kits and for termination to fiber optic connectors or optical devices. In addition, PTFE furcation tubing is not readily available in the twelve standard colors utilized in the telecommunications industry for fiber identification. Regardless, PTFE furcation tubing that is available in different colors typically changes color when chemically etched to increase tensile bond strength.

Regardless of the type of furcation tubing used, a slight amount of movement of an optical fiber within a conventional fanout furcation kit is inevitable. In an effort to prevent further ingress of an optical fiber into a fanout furcation kit as a result of longitudinal shrinkage of the furcation tubing, the funnel area of the furcation body may be filled with an epoxy or acrylate to limit movement of the optical fibers during extreme temperatures and temperature cycling. However, existing fanout furcation kits filled with an epoxy or acrylate continue to experience unacceptable attenuation and micro-damage to optical fibers installed in an outdoor fiber optic network. In some instances, the epoxy or acrylate drains out of the funnel area during the cure cycle, resulting in insufficient adhesion to the optical fibers, or exposure of the optical fibers to the ambient environment. More viscous epoxies and acrylates have been used to reduce drainage with only limited success since a more viscous epoxy or acrylate increases the likelihood of developing voids that reduce adhesion and expose the optical fibers to the ambient environment. In other instances, the optical fibers are not fully encapsulated by the epoxy or acrylate since some of the optical fibers are positioned immediately below another optical fiber, and thus, are not readily visible during assembly, while the funnel area is being filled with the epoxy or acrylate, and after the epoxy or acrylate is cured.

Based on the foregoing, it is apparent improved furcation tubing is needed that provides reduced longitudinal shrinkage and increased tensile bond strength in the twelve standard colors utilized in the telecommunications industry for fiber identification. An improved fanout furcation kit is also needed that prevents movement of the optical fibers in the funnel area of the furcation body as a result of exposure to extreme temperatures and temperature cycling. Use of the improved furcation tubing and fanout furcation kit significantly reduces the likelihood of unacceptable attenuation and micro-damage to optical fibers deployed in an outdoor fiber optic network.

BRIEF SUMMARY OF THE INVENTION

To achieve the foregoing and other objects, and in accordance with the purposes of the invention as broadly described herein, the present invention provides various embodiments of furcation tubing having reduced longitudinal shrinkage and increased tensile bond strength. The present invention also provides various embodiments of a fanout furcation kit that prevents movement of the optical fibers as a result of exposure to extreme temperatures and temperature cycling. In the various exemplary embodiments shown and described herein, the improved furcation tubing and the improved fanout furcation kit significantly reduce the likelihood of unacceptable attenuation and micro-damage to optical fibers deployed in an outdoor fiber optic network. In addition, the present invention also provides improved manufacturing process capabilities and reduced manufacturing and assembly times, along with generally enhanced mechanical strength and environmental performance in certain outdoor installations.

In one aspect, the present invention is embodied by furcation tubing for encasing an optical fiber wherein the furcation tubing has an inner diameter greater than the optical fiber and an outer diameter greater than the inner diameter. The furcation tubing is made of a material comprising glass-filled Teflon (PTFE) such that the furcation tubing experiences no more longitudinal shrinkage than furcation tubing having substantially the same inner diameter and outer diameter that is made of a material consisting essentially of polyvinylidene fluoride (PVDF). The furcation tubing also has a tensile bond strength no less than furcation tubing having substantially the same inner diameter and outer diameter that is made of a material consisting essentially of clear, etched Teflon (PTFE).

In another aspect, the present invention is embodied by furcation tubing for encasing an optical fiber in an outdoor fiber optic network. The furcation tubing includes an elongate furcation tube having an inner diameter and an outer diameter greater than the inner diameter with the inner diameter defining an inner surface and the outer diameter defining an outer surface. The tube includes at least a first layer disposed between the inner diameter and the outer diameter adjacent the outer surface of the furcation tube. The first layer is made of a material having a coefficient of thermal expansion (CTE) no greater than the CTE of a material consisting essentially of polyvinylidene fluoride (PVDF) and no greater than the CTE of a material consisting essentially of Teflon (PTFE). The outer surface of the furcation tube provides a tensile bond strength no less than the tensile bond strength of an outer surface formed from a material consisting essentially of PVDF and no less than the tensile bond strength of an outer surface formed from a material consisting essentially of clear, etched Teflon (PTFE).

In yet another aspect, the present invention is embodied by a fanout furcation kit including a fanout furcation body having a first end and a second end. The fanout furcation body defines a funnel area between the first end and the second end for receiving a plurality of individual optical fibers of a multi-fiber optical cable. An insert block is disposed within the fanout furcation body between the funnel area and the second end. The insert block defines a plurality of passageways extending therethrough for receiving the plurality of individual optical fibers. The passageways of the insert block are arranged in at least two spaced apart rows defining a staggered array so that each of the individual optical fibers is visible from above and none of the optical fibers is obscured from view by another optical fiber.

In yet another aspect, the present invention is embodied by a ribbon fanout kit (RFK) for separating an optical fiber ribbon containing a plurality of optical fibers into individual optical fibers and protecting the individual optical fibers. The ribbon fanout kit includes a lower furcation body having a lead-in area adjacent a first end and a funnel area disposed medially between the lead-in area and a second end. The optical fiber ribbon is positioned within the lead-in area and the individual optical fibers are positioned within the funnel area. The ribbon fanout kit further includes a heat shrink having a rearward face and a passageway therethrough for receiving the optical fiber ribbon. The heat shrink is disposed about the optical fiber ribbon and positioned within the lead-in area of the lower furcation body. The ribbon fanout kit further includes an insert block having a forward face and a plurality of passageways therethrough for receiving the individual optical fibers. The insert block is positioned within the lower furcation body between the funnel area and the second end. The ribbon fanout kit further includes an upper furcation body made of a generally transparent material and configured to be secured to the lower furcation body such that the individual optical fibers within the funnel area are visible through the upper furcation body.

In yet another aspect, the present invention is embodied by a buffer fanout kit (BFK) for separating a buffer tube containing a plurality of optical fibers into individual optical fibers and protecting the individual optical fibers. The buffer fanout kit includes a lower furcation body having a lead-in area adjacent a first end and a funnel area disposed medially between the lead-in area and a second end. The buffer tube is positioned within the lead-in area and the individual optical fibers are positioned within the funnel area.

The buffer fanout kit further includes a crimp assembly comprising a crimp tube disposed about the buffer tube and positioned within the lead-in area of the lower furcation body.

The buffer fanout kit further includes an insert block having a forward face and a plurality of passageways therethrough for receiving the individual optical fibers. The insert block is positioned within the lower furcation body between the funnel area and the second end. The buffer fanout kit further includes an upper furcation body made of a generally transparent material and configured to be secured to the lower furcation body such that the individual optical fibers within the funnel area are visible through the upper furcation body.

In yet another aspect, the invention is embodied by a method of separating a multi-fiber optical cable into a plurality of individual optical fibers and protecting the individual optical fibers. The method includes providing a fanout furcation kit including a lower furcation body and a generally transparent upper furcation body. The lower furcation body defines a lead-in area adjacent a first end and a funnel area medially disposed between the lead-in area and a second end. The method further includes positioning the multi-fiber optical cable within the lead-in area of the lower furcation body with the individual optical fibers disposed within the funnel area of the lower furcation body. The method further includes providing an insert block having a plurality of passageways therethrough and positioning the insert block within the lower furcation body between the funnel area and the second end. The method further includes threading the individual optical fibers through the passageways of the insert block such that the individual optical fibers extend beyond the second end. The method further includes securing the upper furcation body onto the lower furcation body. The method further includes filling the funnel area with an acrylate having thixotropic properties that is cured by exposure to ultraviolet (UV) wavelength light such that the individual optical fibers are fully encapsulated by the acrylate. The method further includes exposing the acrylate to ultraviolet (UV) wavelength light until the acrylate is cured to prevent movement of the individual optical fibers within the funnel area when the fanout furcation kit is exposed to extreme temperatures or temperature cycling.

BRIEF DESCRIPTION OF THE DRAWINGS

These and other features, aspects and advantages of the present invention are better understood when considered in view of the following detailed description of the invention and read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the embodiments set forth herein. These exemplary embodiments are provided so that this disclosure will be both thorough and complete, and will fully convey the broad scope of the invention to those skilled in the art. Like reference numbers refer to like elements throughout the various drawings.

The various embodiments shown and described herein provide furcation tubing for transitioning a multi-fiber optical cable into individual optical fibers and a fanout furcation kit for separating the optical fibers of a multi-fiber optical cable into individual optical fibers and protecting the optical fibers at the separation location. The improved furcation tubing provides reduced longitudinal shrinkage and increased tensile bond strength. The improved fanout furcation kit prevents movement of the optical fibers within the funnel area of the furcation body as a result of exposure to extreme temperatures and temperature cycling. Use of the improved fanout furcation kit, with or without the improved furcation tubing, significantly reduces the likelihood of unacceptable attenuation and micro-damage to optical fibers deployed in an outdoor fiber optic network. In addition, the fanout furcation kit of the present invention also provides improved process capabilities for separating optical fibers from an optical fiber ribbon or buffer tube and reduced manufacturing and assembly times, along with generally enhanced mechanical strength and environmental performance in some outdoor installations.

Figure 1A:
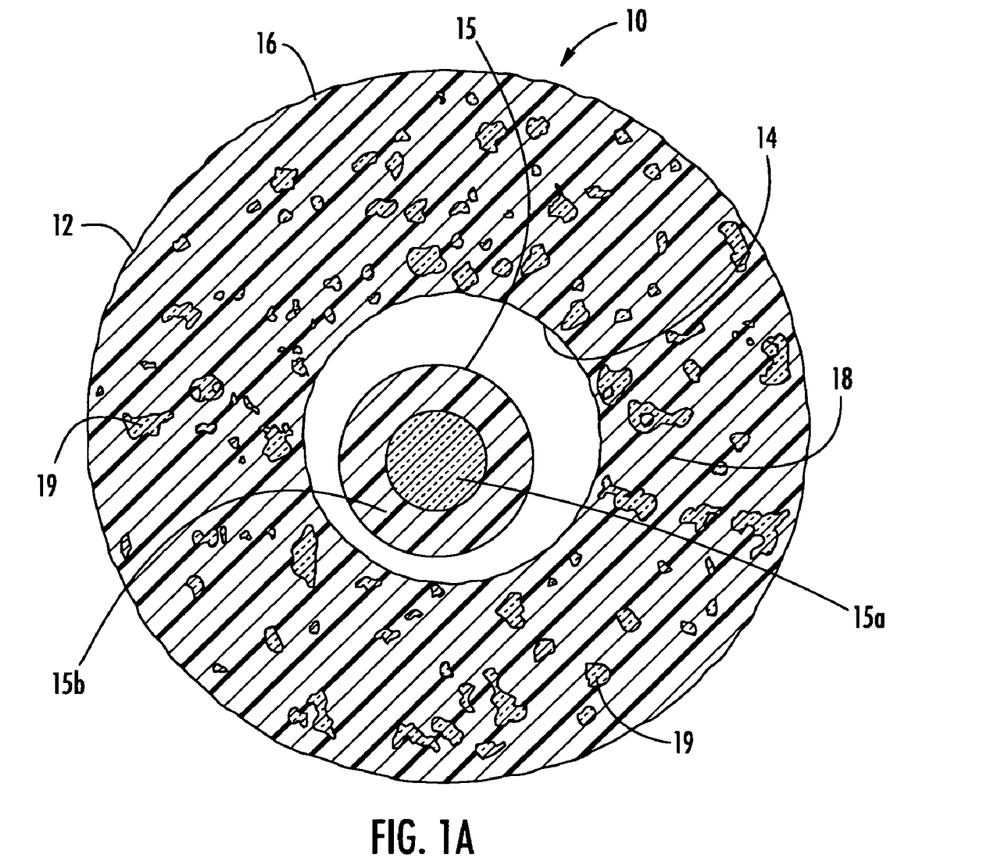
FIG. 1A is a lateral cross-section view of an embodiment of furcation tubing according to the present invention.

A lateral cross-section of an exemplary embodiment of furcation tubing 10 according to the present invention is shown in FIG. 1A. The furcation tubing 10 comprises an elongate, extruded tube 12 having an inner diameter 14 and an outer diameter 16. The inner diameter 14 is large enough to have at least one optical fiber 15 encased within the tube 12 in sliding relation (i.e., a loose-tube configuration). The optical fiber 15 comprises an inner core 15a formed of an optically transmissive (e.g., transparent) material, such as glass, and an outer coating or buffer 15b formed of an optically reflective (e.g., opaque) material, such as plastic. As will be appreciated by those skilled in the art, the inner diameter 14 may be larger in order to have a plurality of optical fibers 15 encased within the tube 12 in sliding relation, and thereby form a buffer tube or a jacketed or unjacketed multi-fiber, loose-tube optical cable. The outer diameter 16 may also be sized as desired to form a furcation tube, buffer tube or loose-tube optical cable. As shown and described herein, the tube 12 is furcation tubing and the outer diameter 16 preferably is between about 250 microns (μm) and about 900 microns (μm).

Alternatively, the tube 12 may be jacketed to form a loose-tube optical cable having any desired outer diameter 16, such as 1.65 mm, 2.0 mm or 2.9 mm, for use with optical devices (e.g., optical couplers, optical splitters, etc.). Regardless, the tube 12 is made of a material having enhanced thermal stability (i.e., low CTE) with less longitudinal shrinkage than conventional polyvinylidene fluoride (PVDF) tubing. The material of the tube 12 also has enhanced bonding characteristics as compared to chemically-etched Teflon (PTFE) tubing. In addition, the material of the tube 12 can be produced in each of the twelve standard colors utilized in the telecommunications industry for fiber identification, for example, as specified by the known Munsell Color Charts and standards EIA R5359-A, EIA-TIA 598-A and EIA-TIA 598-B.

As shown in FIG. 1A, the tube 12 is made of a material 18 consisting essentially of Teflon with the addition of a glass filler 19, for example glass shards. In particular, the material 18 is Teflon with a generally even distribution of glass filler 19 disposed between the inner diameter 14 and the outer diameter 16 of the tube 12. Preferably, the material 18 has not less than about 5% by volume of glass filler 19 and not more than about 15% by volume of glass filler 19. More preferably, the material 18 has between about 7% and about 10% by volume of glass filler 19. Accordingly, furcation tubing 10 is referred to herein as glass-filled Teflon tubing, or GF-PTFE furcation tubing. The GF-PTFE furcation tubing 10 may be formed in any conventional manner, but preferably is extruded in a one step process using pressure to force the material 18 through a die on a rain extruder of the type available from Keicher Engineering AG. The addition of the glass filler 19 to the Teflon in the material 18 of tube 12 provides enhanced thermal stability and reduced longitudinal shrinkage as compared to furcation tubing made of a material consisting essentially of PVDF or Teflon (PTFE). The presence of the glass filler 19 in the material 18 adjacent the outer diameter of tube 12 provides a relatively rough outer surface that increases the tensile bonding strength of the furcation tubing 10.

Figure 1B:
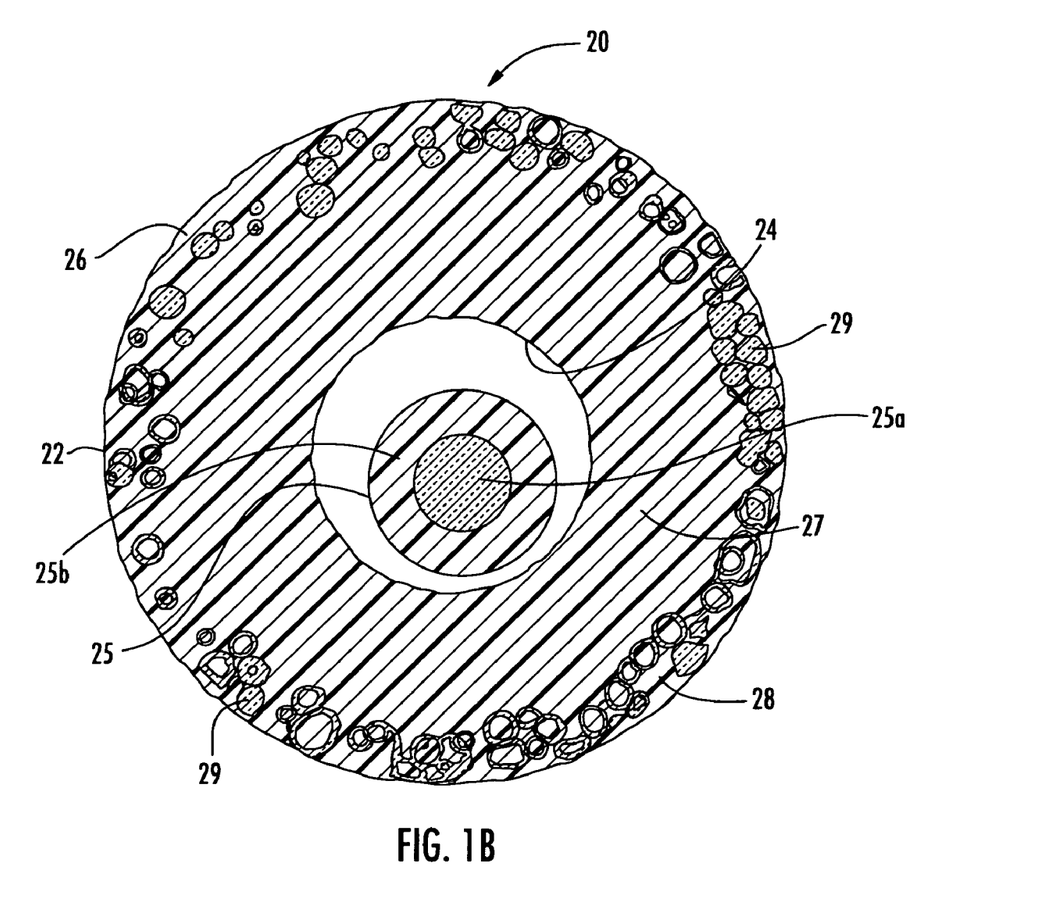
FIG. 1B is a lateral cross-section view of another embodiment of furcation tubing according to the present invention.

A lateral cross-section of another exemplary embodiment of furcation tubing 20 according to the present invention is shown in FIG. 1B. The furcation tubing 20 comprises an elongate, extruded tube 22 having an inner diameter 24 and an outer diameter 26. The inner diameter 24 is large enough to have at least one optical fiber 25 encased within the tube 22 in sliding relation (i.e., a loose-tube configuration). The optical fiber 25 comprises an inner core 25a formed of an optically transmissive (e.g., transparent) material, such as glass, and an outer coating or buffer 25b formed of an optically reflective (e.g., opaque) material, such as plastic. As previously described, the inner diameter 24 may be larger in order to have a plurality of optical fibers 25 encased within the tube 22 in sliding relation, and thereby form a buffer tube or a jacketed or unjacketed multi-fiber, loose-tube optical cable. Likewise, the outer diameter 26 may be sized as desired to form a furcation tube, buffer tube or loose-tube optical cable, as described above. Regardless, the tube 22 is made of a material having enhanced thermal stability with less longitudinal shrinkage than conventional polyvinylidene fluoride (PVDF) tubing, and having enhanced bonding characteristics on the outer diameter 26 as compared to chemically-etched Teflon (PTFE) tubing. In addition, the material of the tube 22 is made of a material that can be produced in each of the twelve standard colors utilized in the telecommunications industry for fiber identification.

As shown in FIG. 1B, the tube 22 comprises an inner layer made of a material 27 consisting essentially of Teflon and an outer layer made of a material 28 consisting essentially of Teflon with the addition of a glass filler 29, for example glass shards. In particular, the outer layer of the tube 22 is made of a material 28 consisting essentially of Teflon with a generally even distribution of glass filler 29 disposed between the outer diameter of the inner layer and the outer diameter 26 of the tube 22. Preferably, the material 28 has not less than about 5% by volume of glass filler 29 and not more than about 15% by volume of glass filler 29. More preferably, the material 28 has between about 7% and about 10% by volume of glass filler 29. Accordingly, furcation tubing 20 is referred to herein as dual layer glass-filled Teflon tubing, or DLGF-PTFE furcation tubing. The DLGF-PTFE furcation tubing 20 may be formed in any conventional manner, such as a two-step extrusion process, but preferably is extruded in a one step process using pressure to force the material 27, 28 through a die on a ram extruder of the type available from Keicher Engineering AG. The addition of the glass filler 29 to the Teflon in the material 28 of tube 22 provides enhanced thermal stability and reduced longitudinal shrinkage as compared to furcation tubing made of a material consisting essentially of PVDF or Teflon (PTFE). The presence of the glass filler 29 in the material 28 adjacent the outer diameter of tube 22 provides a relatively rough outer surface that increases the tensile bonding strength of the furcation tubing 20. The absence of the glass filler 29 in the material 27 adjacent the inner diameter 24 provides a relatively smooth inner surface that protects the optical fiber(s) 25 disposed within the tube 22 from micro-damage caused by sliding contact with the glass filler.

Figure 2:
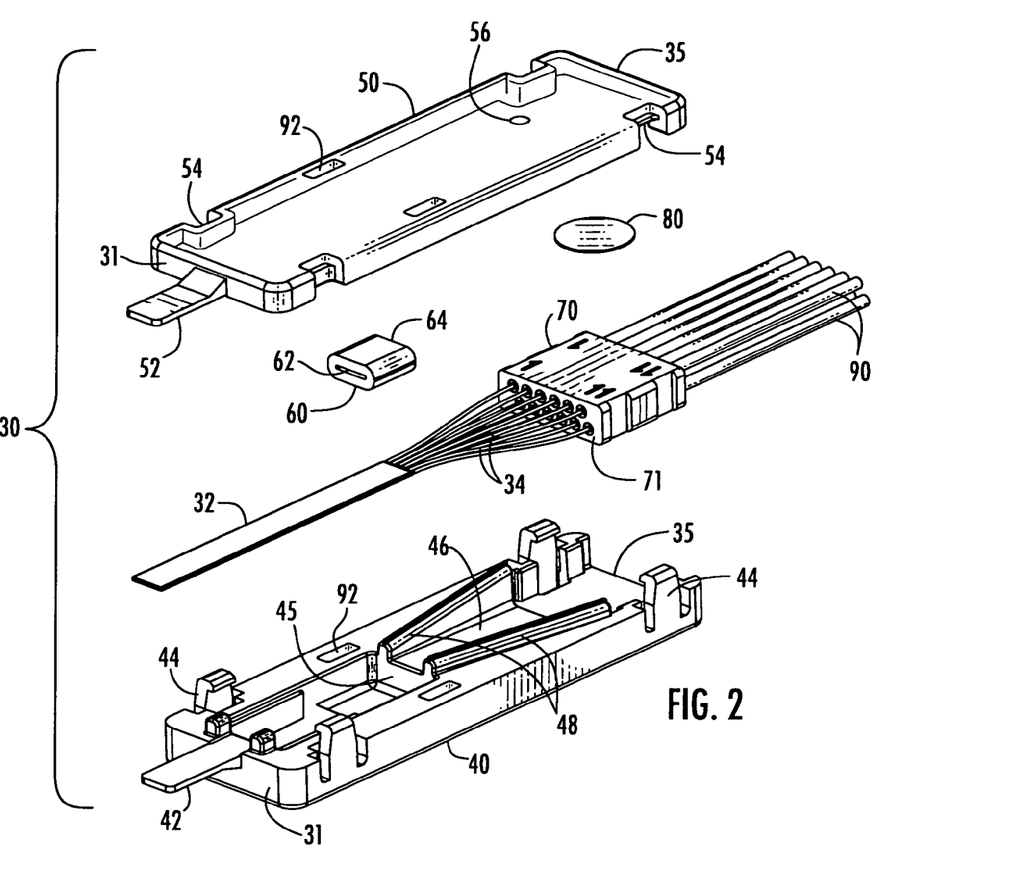
FIG. 2 is an exploded perspective view of an embodiment of a fanout furcation kit according to the present invention for use with a multi-fiber optical cable comprising an optical fiber ribbon.
Figure 3:
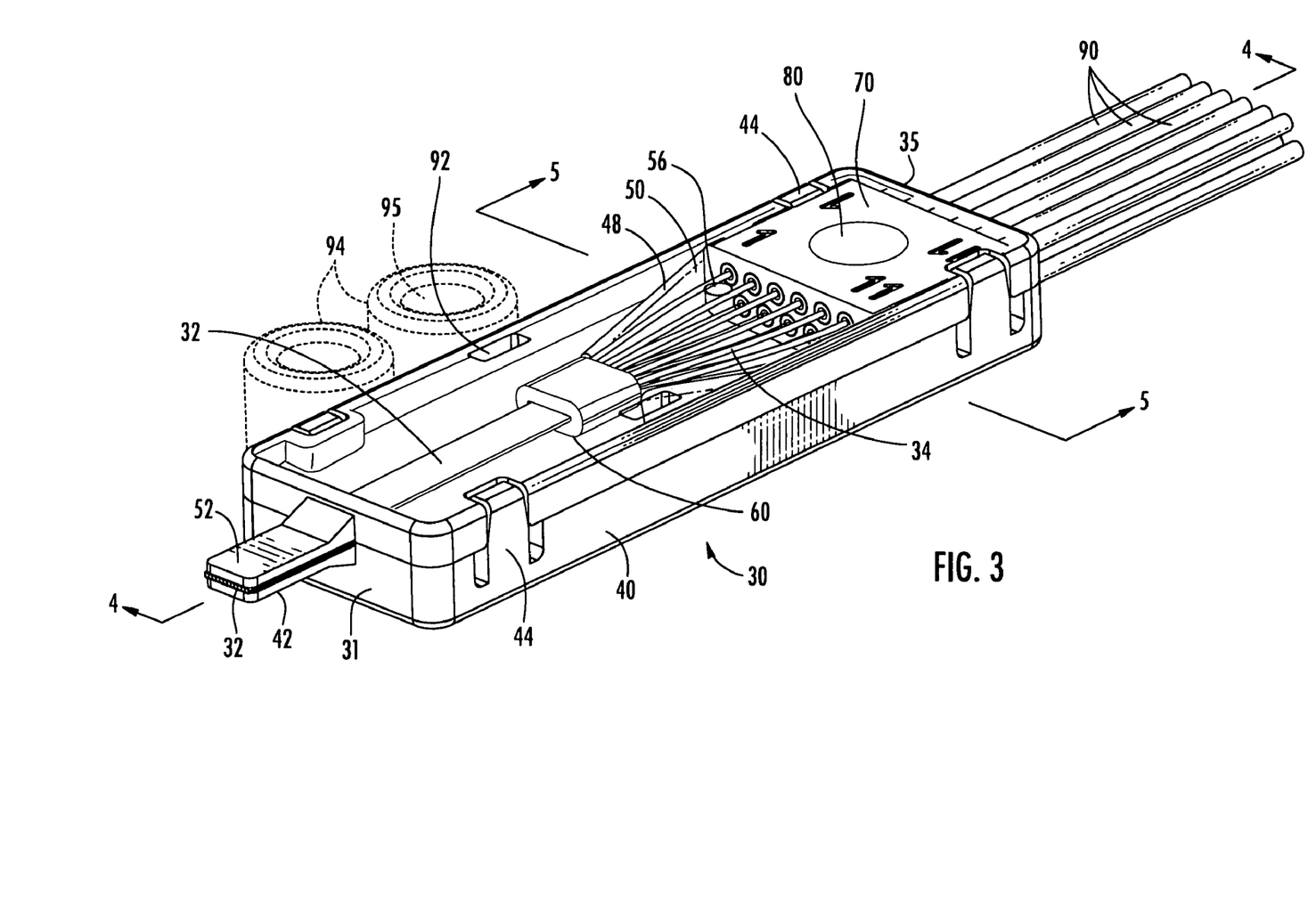
FIG. 3 is a perspective view of the fanout furcation kit of FIG. 2 shown fully assembled.
Figure 4:
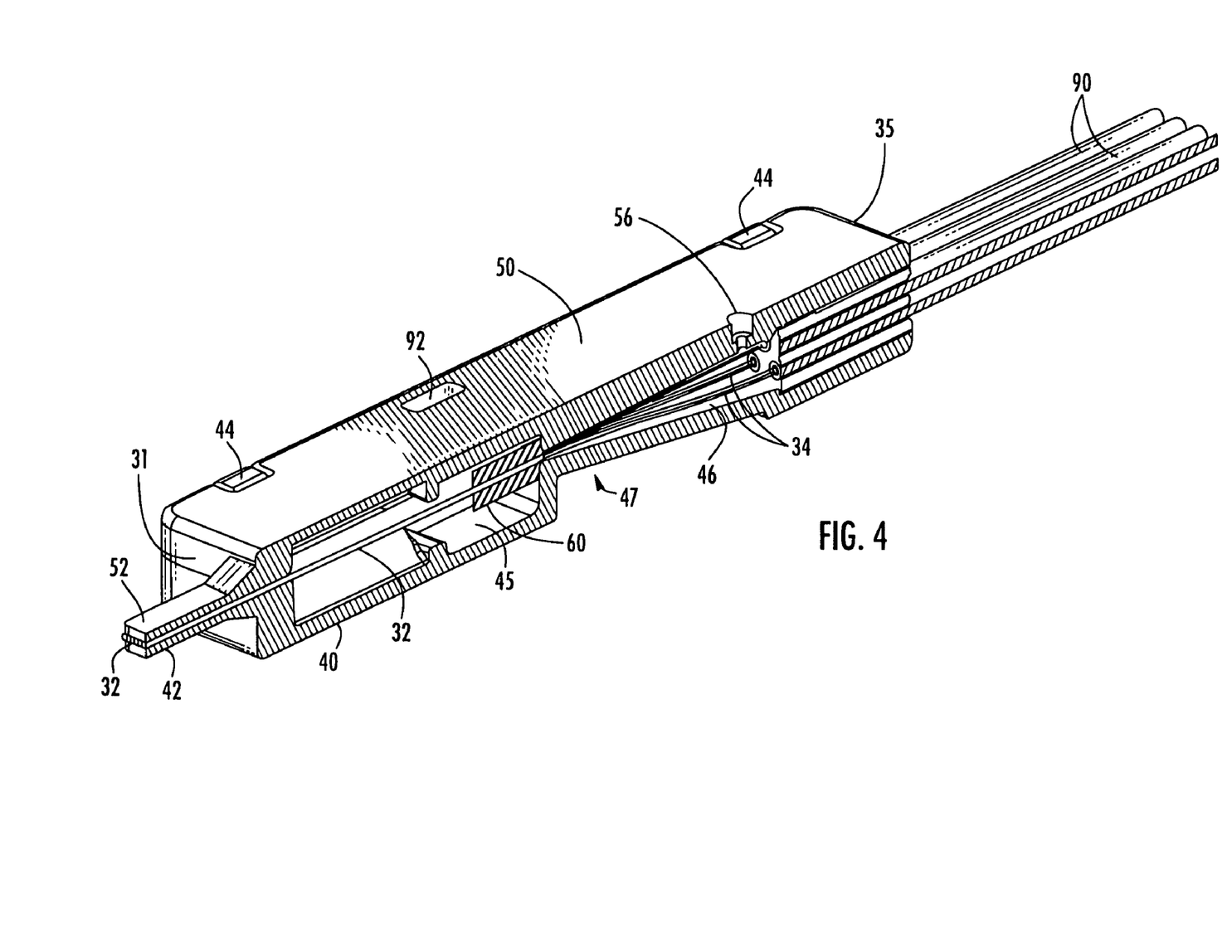
FIG. 4 is a longitudinal cross-section view of the assembled fanout furcation kit of FIG. 3 taken through the line indicated by 4-4.
Figure 5:
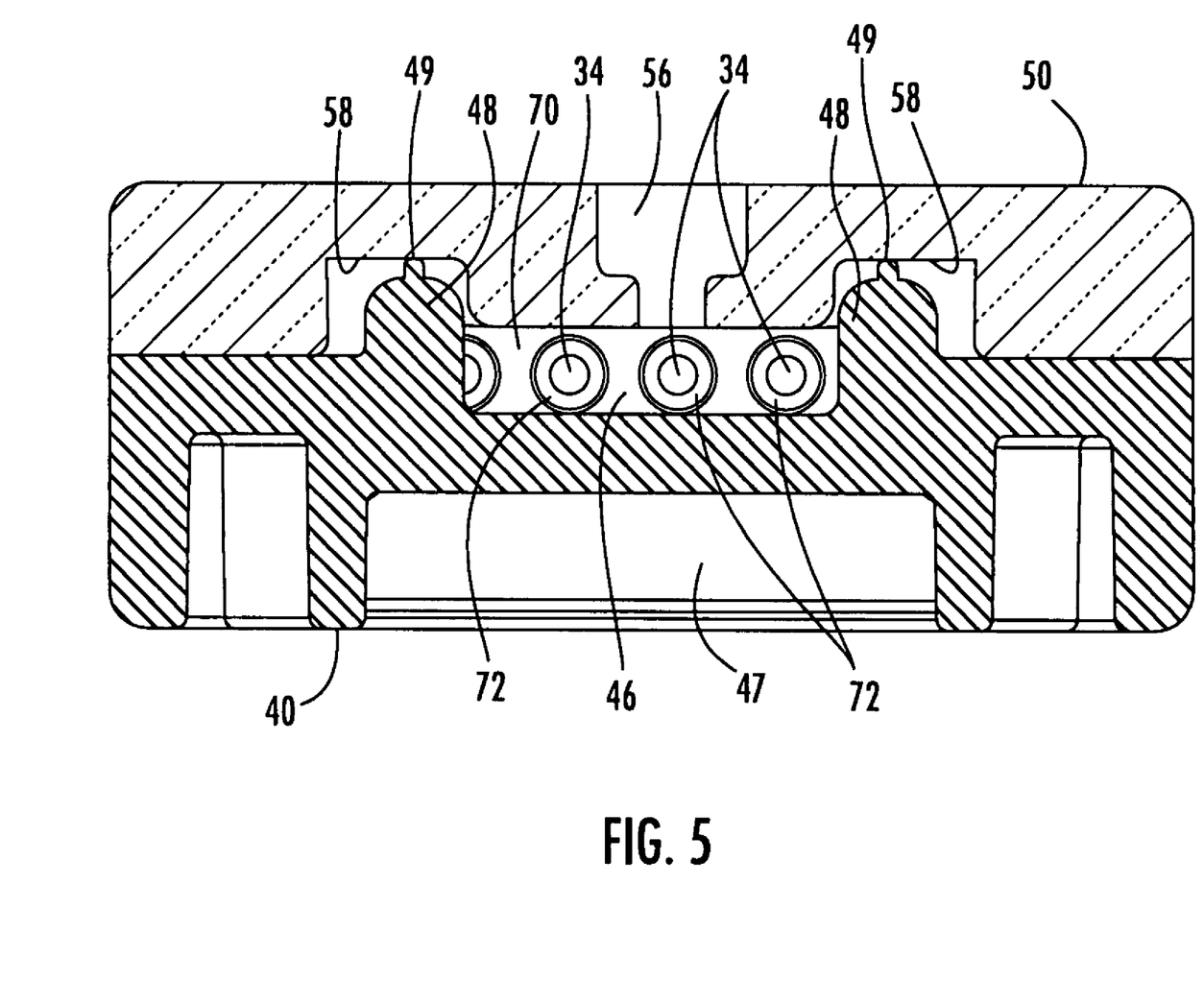
FIG. 5 is a lateral cross-section view of the assembled fanout furcation kit of FIG. 3 taken through the line indicated by 5-5.
Figure 6:
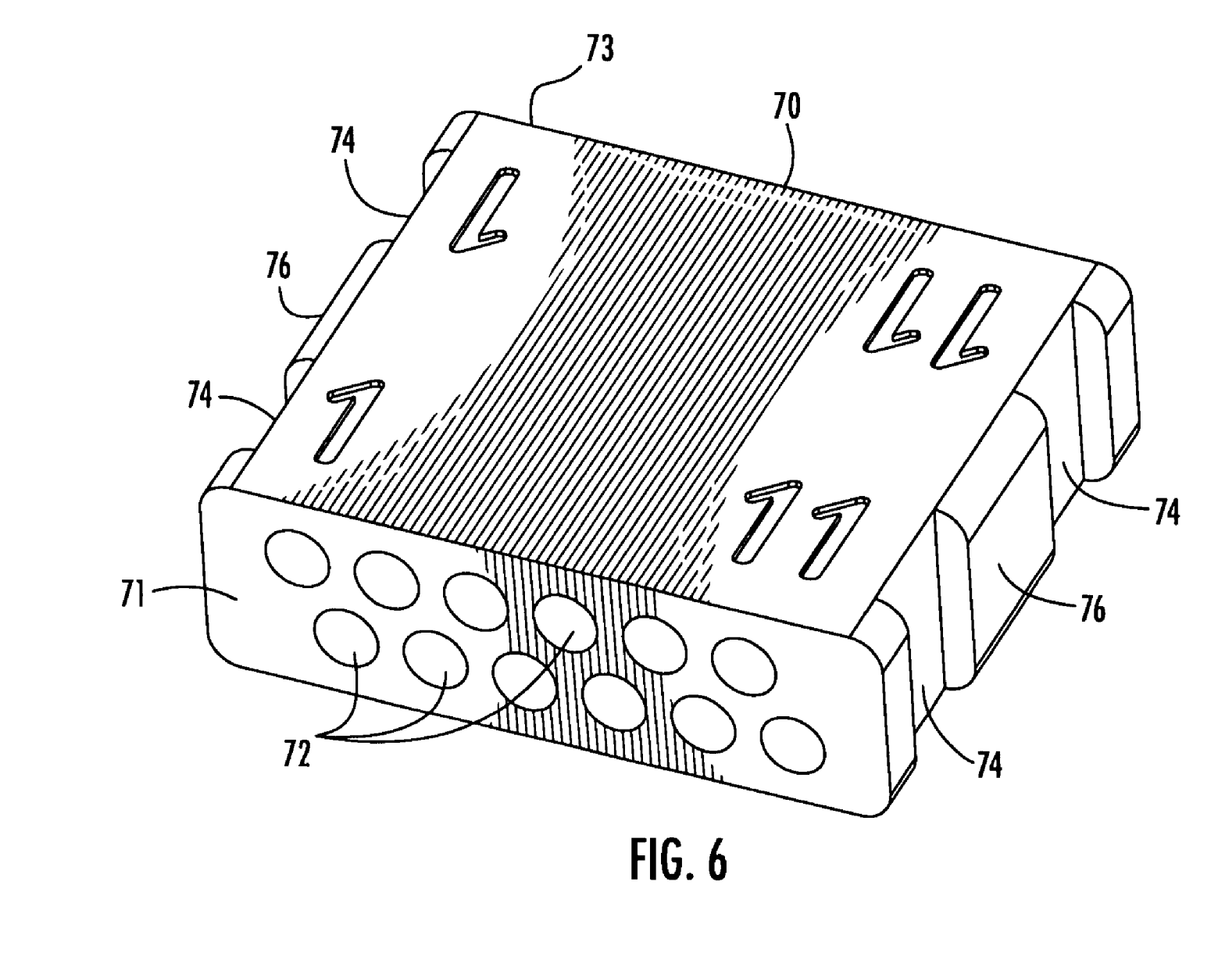
FIG. 6 is an enlarged perspective view of the insert block of the fanout furcation kit of FIG. 2.

An exemplary embodiment of a fanout furcation kit 30 according to the present invention is shown in FIGS. 2-6. An exploded (i.e., unassembled) perspective view of the fanout furcation kit 30 is shown in FIG. 2, while a perspective view of the fanout furcation kit fully assembled is shown in FIG. 3. FIG. 4 is a longitudinal cross-section view of the fanout furcation kit 30 taken through the line indicated by 5-5 in FIG. 3, and FIG. 5 is a lateral cross-section view of the fanout furcation kit taken through the line indicated by 4-4 in FIG. 3. An enlarged perspective view of the insert block 70 of the fanout furcation kit 30 is shown in FIG. 6. As shown, the fanout furcation kit 30 comprises a lower furcation body 40, an upper furcation body 50, a heat shrink 60, an insert block 70 and an ultraviolet (UV) indicator 80 that is sensitive to ultraviolet (UV) wavelength light. The fanout furcation kit 30 receives a multi-fiber optical cable 32 adjacent a first end 31 of the fanout furcation kit 30 and separates the plurality of optical fibers of the multi-fiber optical cable 32 into individual optical fibers 34 encased within furcation tubing 90 adjacent a second end 35 of the fanout furcation kit. Although not required, the furcation tubing 90 preferably is the furcation tubing 10, 20 described herein with reference to FIGS. 1A and 1B. In this manner, the fanout furcation kit 30 may obtain the additional benefits provided by the GF-PTFE furcation tubing 10 or the DLGF-PTFE furcation tubing 20. In particular, the furcation tubing 90 is required to experience no more longitudinal shrinkage than a furcation tubing having substantially the same inner diameter and outer diameter made of a material comprising essentially polyvinylidene fluoride (PVDF), and to have a tensile bond strength no less than a furcation tubing having substantially the same inner diameter and outer diameter made of a material comprising essentially clear, etched PTFE. More preferably, the furcation tubing 90 has a lower CTE than both PVDF furcation tubing and PTFE furcation tubing, and has higher tensile bond strength than clear, etched PTFE furcation tubing. The furcation tubing 90 of a fanout furcation kit 30 according to the present invention having an outer diameter of about 900 microns (μm) will withstand a tensile pull force of at least about 1.65 lbs., and preferably as much as 2.2 lbs., without being detached from the insert block 70. It has been found that the desired tensile bond strength can be obtained by mechanically or chemically etching furcation tubing 90 made of a material comprising PTFE and using Loctite® 454 adhesive available from Henkel Loctite Corporation of Rocky Hill, Conn. to secure the furcation tubing within the insert block 70.

As will be described in greater detail, the multi-fiber optical cable 32, the heat shrink 60, the optical fibers 34 and the insert block 70 are disposed within the lower furcation body 40. The lower furcation body 40 is formed of a molding material, such as plastic or composite, that is capable of being molded with the precision geometry best shown in FIG. 2. Preferably, the lower furcation body 40 is formed from a generally opaque, high performance polymer which combines high strength and rigidity at elevated temperatures with long term heat resistance. A suitable molding material for forming the lower furcation body 40 has been found to be Ultem® Polyetherimide (PEI), and more particularly, glass-reinforced Ultem® 2210 available from GE Plastics of Pittsfield, Mass. The glass-reinforced Ultem® 2210 material provides greater rigidity and dimensional stability, while maintaining the exceptional strength-to-weight ratio and increased tensile strength of the standard Ultem® material. The lower furcation body 40 comprises a lead-in area 45 adjacent the first end 31 for receiving the multi-fiber optical cable 32 and the heat shrink 60. As shown, the multi-fiber optical cable 32 is an optical fiber ribbon comprising a plurality of parallel aligned optical fibers bound together by a ribbon matrix in a known manner, and the lower furcation body 40 comprises an optional lower ribbon guide 42 for supporting and guiding the optical fiber ribbon into the lead-in area 45. As such, the embodiment of the fanout furcation kit 30 shown in FIGS. 2-6 is commonly referred to as a "Ribbon fanout kit (RFK)."

The lower furcation body 40 further comprises a funnel area 46 medially between the lead-in area 45 and the second end 35 for transitioning the optical fibers 34 separated from the multi-fiber optical cable 32 in to the insert block 70. The funnel area 46 is defined by the rearward face 64 of the heat shrink 60, the forward face 71 of the insert block 70, and the guide walls 48 of the lower furcation body 40. The guide walls 48 project upwardly from the floor of the lower furcation body 40 in the direction of the upper furcation body 50 and are angled outwardly in the direction of the second end 35 (i.e., rearwardly) to form a generally funnel-shaped transition area for the optical fibers 34 extending between the rearward face 64 of the heat shrink 60 and the forward face 71 of the insert block 70. Funnel area 46 serves to smoothly transition the optical fibers 34 from the heat shrink 60 into the insert block 70 without introducing appreciable attenuation loss due to bending of the optical fibers. The funnel area 46 is also referred to herein as the "bathtub" since the four walls defined by the rearward face 64 of the heat shrink 60 on one end, the forward face 71 of the insert block 70 on the other end, and the guide walls 48 on either side form a reservoir in the general shape of a bathtub. The bathtub receives an epoxy or acrylate that prevents movement of the optical fibers 34 within the funnel area 46 of the fanout furcation kit 30 as a result of longitudinal shrinkage of the furcation tubes 90 in response to exposure to extreme temperatures and temperature cycling. As best shown in FIG. 4, the floor of the lower furcation body 40 in the funnel area 46 is angled downwardly in the direction of the second end 35 so that the bathtub is deeper adjacent the forward face 71 of the insert block 70 than adjacent the rearward face 64 of the heat shrink 60. As a result, the epoxy or acrylate disposed within the funnel area 46 will naturally flow towards the insert block 70 and fully surround the optical fibers 34 adjacent the forward face 71 (i.e., the entrance) of the insert block. As a result, the optical fibers 34 are fully encapsulated by the epoxy or acrylate and the possibility of a void (e.g., air pocket) forming between an optical fiber and the epoxy or acrylate is significantly reduced. The lower furcation body 40 further comprises flexible locking latches 44 for securing the upper furcation body 50 to the lower furcation body, as will be described, and through holes 92 for receiving means for securing the fanout furcation kit 30 to an optical device or optical hardware, as will be described. As best shown in FIG. 4 and FIG. 5, the lower furcation body 40 has a hollowed out, or cored, portion 47 that defines the floor of the funnel area 46, while increasing structural rigidity and improving the molding characteristics of the lower furcation body. The cored portion 47 maintains uniform wall thicknesses in the lower furcation body 40, thereby minimizing shrinkage of the molding material.

The upper furcation body 50 is formed of a molding material, such as plastic or composite, that is capable of being molded with the precision geometry best shown in FIG. 2. Preferably, the upper furcation body 50 is formed from a substantially transparent polymer having high clarity and transmittance of ultraviolet (UV) wavelength light, as well as visible wavelength light. A suitable molding material for forming the upper furcation body 50 has been found to be UDEL® Polysulfone, and more particularly, UDEL P-3700 HC available from Solvay Advanced Polymers of Marietta, Ohio. The UDEL P-3700 HC material combines the clarity of polycarbonate with the high temperature resistance of polysulfone. The upper furcation body 50 comprises an optional upper ribbon guide 52 for supporting and guiding the optical fiber ribbon into the lead-in area 45 of the lower furcation body 40. As will be readily appreciated, the lower ribbon guide 42 and the upper ribbon guide 52 operate together to prevent the optical fiber ribbon 32 from twisting as it enters the fanout furcation kit 30 and, to at least some extent, restricts the optical fiber ribbon from sliding within the lead-in area 45. The upper furcation body 50 further comprises recesses 54 for receiving the locking latches 44 of the lower furcation body 40 to secure the upper furcation body to the lower furcation body, and through holes 92 for receiving means for securing the fanout furcation kit 30 to an optical device or optical hardware. The through holes 92 of the upper furcation body 50 are aligned with the through holes 92 of the lower furcation body 40 when the upper furcation body and the lower furcation body are secured together by the action of locking latches 44 engaging recesses 54. The upper furcation body 50 further comprises a fill port 56 medially disposed between the first end 31 and the second end 35 of the fanout furcation kit 30. More particularly, the fill port 56 is positioned between the heat shrink 60 and the insert block 70 so that the fill port is in fluid communication with the funnel area 46 when the upper furcation body 50 and the lower furcation body 40 are secured together. As best shown in FIG. 4, the fill port 56 has a larger diameter opening adjacent the upper surface of the upper furcation body 50 and a smaller diameter opening adjacent the lower surface of the upper furcation body. As a result, the fill port 56 forms a step that prevent the tip of a syringe (not shown) from being inadvertently passed through the smaller diameter opening of the fill port into the funnel area 46 where it could displace and possibly damage the optical fibers 34 of the multi-fiber optical cable 32 transitioning between the heat shrink 60 and the insert block 70.

As best shown in FIG. 5, each of the guide walls 48 of the lower furcation body 40 may be provided with an upwardly extending ridge 49 that engages a complimentary surface 58 on the underside (i.e., lower surface) of the upper furcation body 50. The surfaces 58 may be generally flat, as shown, or may be concave to receive the corresponding ridge 49 in an interference or slight press fit when the upper furcation body 50 is secured on the lower furcation body 40. Engagement of the ridges 49 with the surfaces 58 forms a seal between the upper furcation body 50 and the lower furcation body 40 to prevent the epoxy or acrylate disposed within the funnel area 46 from being pulled by viscous forces or being wicked by capillary action into the fill port 56 and thereby creating a void around an optical fiber 34. Any such void could expose the optical fiber to the ambient environment and lead to unacceptable transmission loss (i.e., attenuation) in environmental testing and/or installation in an outdoor fiber optic network.

The epoxy or acrylate used to fill the funnel area 46 and thereby encapsulate the optical fibers 34 of the fanout furcation kit 30 may be any epoxy or acrylate having suitable fiber adhesion, shrinkage, toughness, CTE and viscosity properties. Adequate fiber adhesion is required to ensure that there is no pistoning of the optical fibers 34 when the fanout furcation kit 30, and especially furcation tubes 90, are exposed to extreme temperatures and/or temperature cycling. Adequate shrinkage is required to lock in any bend loss resulting from assembly. Adequate toughness is required to retain the optical fibers 34 within the funnel area 46. A suitable CTE is required to ensure that the expansion and contraction of the epoxy or acrylate is compatible with other components of the fanout furcation kit 30, and in particular, with the optical fiber ribbon 32. A suitable viscosity is required to ensure that the epoxy or acrylate will flow evenly throughout the funnel area 46 and fully encapsulate the optical fibers 34 without draining or repositioning the optical fibers while curing. Epoxies and acrylates that may be formulated with the desired properties may include without limitation LC-1211 and DP-810 and DP-125 available from the 3M Company Adhesives Division of St. Paul, Minn., Loctite® E-05CL™ Hysol® and Loctite® E-0151™ Hysol® available from Henkel Loctite Corporation of Rocky Hill, Conn., and blended formulations commercially known as EP-8 and EP-9 available from Corning Cable Systems LLC of Hickory, N.C.

It has been determined from assembly trials and subsequent environmental testing that an epoxy or acrylate comprising a thixotropic material provides the desired fiber adhesion, shrinkage, toughness, CTE and viscosity properties. A thixotropic material has a very low viscosity in shear and a relatively high viscosity otherwise. The low viscosity in shear permits the epoxy or acrylate to be rapidly dispensed from a syringe. The relatively high viscosity other than shear minimizes wicking due to capillary action that draws the epoxy or acrylate out of the funnel area 46 into the fill port 56 and creates a possible void around an optical fiber 34. Preferably, the epoxy or acrylate is also formulated to be cured relatively quickly by exposure to ultraviolet (UV) wavelength light to minimize the time required for processing. A suitable epoxy or acrylate will cure with exposure to ultraviolet (UV) wavelength light in less than about 1 hour, more preferably less than about 15 minutes, and most preferably less than about 2 minutes. A shorter cure time may be obtained by rotating the ultraviolet (UV) wavelength light source and/or the assembled fanout furcation kit 30. Furthermore, the epoxy or acrylate is further formulated to cure substantially clear (i.e., transparent) to allow indefinite inspection after curing. The epoxy or acrylate may also be formulated with a fluorescent additive so that the encapsulation of the optical fibers 34 and the extent of the fill of the funnel area 46 may be determined utilizing a black light source. The previously mentioned ultraviolet (UV) indicator 80 is disposed within the fanout furcation kit 30 in a readily visible location to indicate when the epoxy or acrylate has been exposed to a sufficient amount of ultraviolet (UV) wavelength light to effect curing. As shown, indicator 80 is affixed to the upper surface of the insert block 70 between the insert block and the transparent upper furcation body 50. However, the indicator 80 may be positioned in any convenient location on the fanout furcation kit 30, including but not limited to the upper surface of the upper furcation body 50, as long as the indicator does not obstruct the funnel area 46, for a purpose to be described.

The heat shrink 60 of the fanout furcation kit 30 is a heat shrinkable tube that has been expanded mechanically to slide over the optical fiber ribbon 32. The heat shrink 60 is then heated during assembly to shrink down to a tight fit around the optical fiber ribbon 32 so that the ribbon matrix can be removed and the individual optical fibers 34 separated and disposed within the funnel area 46. The heat shrink 60 may, for example, be a fluoropolymer tubing. If desired, the heat shrink 60 may be PTFE heat shrink tubing so as to provide a similar CTE as the optical fiber ribbon 32 and the furcation tubing 90.

PTFE has a shrink temperature of about 327° C. (621° F.), and thus, the most reliable method to shrink the heat shrink 60 is in a controlled temperature oven. However, it is also possible with due care to adequately shrink the heat shrink 60 using a conventional heat gun or welding torch. A suitable material for the heat shrink 60 is Texloc® PTFE heat shrink tubing available from Parker-Texloc of Fort Worth, Tex. Regardless, the heat shrink 60 has a lengthwise passageway 62 formed therethrough and sized for receiving the optical fiber ribbon 32 in a loose-fit configuration. After shrinking, the heat shrink 60 engages the optical fiber ribbon 32 within the passageway 62 in a tight-fit configuration so that the ribbon matrix can be removed beyond the rearward face 64 to expose a desired length of the individual optical fibers 34. The optical fiber ribbon 32 and the heat shrink 60 are positioned within the lead-in area 45 of the lower furcation body 40 with the rearward face 64 of the heat shrink adjacent the forward edges of the guide walls 48 at the entrance to the funnel area 46 (see FIG. 3). The heat shrink 60 may be secured in the proper position within the lower furcation body 40 in any suitable manner, for example by an adhesive or epoxy, by a slight interference fit, or both.

Regardless, the heat shrink 60 is positioned and secured within the lead-in area 45 such that the individual optical fibers 34 extending beyond the rearward face 64 are aligned between the guide walls 48 slightly above the floor of the funnel area 46.

The insert block 70 of the fanout furcation kit 30 is formed from a thermally stable, rigid material, such as plastic or composite. Preferably, the insert block 70 is formed from a material that has a similar CTE and is compatible with the material of the lower furcation body 40 and the upper furcation body 50. Regardless, the insert block 70 has a plurality of lengthwise passageways 72 formed therethrough that are sized to receive the individual optical fibers 34 separated from the optical fiber ribbon 32. The size (i.e., diameter) of the passageways 72 of the insert block 70 may be constant throughout or may be larger adjacent the rearward face 73 of the insert block to accommodate the outer diameter of a larger furcation tube 90, as will be described. As best shown in FIG. 6, the passageways 72 of the insert block 70 are arranged in an array comprising a plurality of horizontal rows that are staggered laterally relative to one another. Thus, no optical fiber 34 received within a passageway 72 is positioned immediately above another optical fiber 34. The staggered array of passageways 72 permits each optical fiber 34 received within a passageway to be viewed from above during assembly, while the funnel area 46 is being filled with an epoxy or acrylate (as will be described), and after the epoxy or acrylate has cured. As shown, the staggered array consists of two rows each having six passageways 72 so that up to twelve individual optical fibers 34 may be accommodated by the insert block 70. However, the insert block 70 may be provided with an array consisting of any desired number of rows having any desired number of passageways 72 as long as each optical fiber 34 received within a passageway can be viewed from above, as previously described. Furthermore, it is also possible that one or more of the passageways 72 may receive more than one optical fiber 34 in order to increase the capacity and/or density of the fanout furcation kit 30. The upper surface of the insert block 70 may also be provided with visible indicia indicating the proper position of a numbered optical fiber, for example, fibers 1-12 of an optical fiber ribbon having the twelve standard colors utilized in the telecommunications industry for fiber identification. As shown, the insert block 70 is generally rectangular and comprises a pair of notches 74 and a projection 76 on each lateral side disposed between the forward face 71 and the rearward face 73. The notches 74 engage complimentary features provided on the lower furcation body 40 adjacent the second end 35 and the projections 76 are seated against the flexible locking latches 44 to position the insert block 70 with the forward face 71 adjacent the rearward edges of the guide walls 48 at the exit of the funnel area 46. The insert block 70 may be further secured within the lower furcation body in any suitable manner, for example by an adhesive or epoxy, by a slight interference fit, or both. Regardless, the insert block 70 is positioned and secured between the funnel area 46 and the second end 35 of the fanout furcation kit 30 such that the individual optical fibers 34 received within passageways 72 are aligned between the guide walls 48 slightly above the floor of the funnel area 46.

The fanout furcation kit 30 may be assembled in any suitable manner, however, a fanout furcation kit according to the present invention preferably is assembled in the following manner to provide improved manufacturing process capabilities and reduced manufacturing and assembly times, along with generally enhanced mechanical strength and environmental performance in certain outdoor installations. The multi-fiber optical cable 32 is threaded through the passageway 62 of the heat shrink 60 a sufficient amount so that a desired length of the individual optical fibers 34 extend beyond the fanout furcation kit 30. The heat shrink 60 is then heat until it adheres tightly around the optical cable 32 at the corresponding location. The heat shrink 60 and the optical cable 32 are then positioned in the lead-in area 45 of the lower furcation body 40 with the optical fibers 34 extending into the funnel area 46 and beyond the fanout furcation kit 30. If desired, the heat shrink 60 may be secured within the lower furcation body 40 in a conventional manner, for example by an adhesive. The optical fibers 34 are next threaded through the corresponding passageways 72 of the insert block 70 until the insert block is positioned in the lower furcation body 40 with the notches 74 engaging the complimentary features provided on the lower furcation body adjacent the second end 35 and the projections 76 seated against the flexible locking latches 44. In this position, the forward face 71 of the insert block is adjacent the rearward edges of the guide walls 48 of the lower furcation body 40. If desired, the insert block may be secured within the lower furcation body 40 in a conventional manner, for example by an adhesive. When fully threaded through the passageways 72, the optical fibers 34 naturally transition in a smooth manner through the funnel area 46 from the rearward face 64 of the heat shrink 60 to the forward face 71 of the insert block 70. In particular, the optical fibers 34 transition through the funnel area without twisting or overlapping, and without introducing appreciable attenuation loss due to bending of the optical fibers.

The optical fibers 34 may be disposed (i.e., encased) within furcation tubes 90 and the furcation tubes secured within the corresponding passageways 72 adjacent the rearward face 73 of the insert block 70 before or after the insert block is positioned within lower furcation body 40. Preferably, however, the furcation tubes 90 are pre-assembled to the insert block 70 and the optical fibers 34 are threaded into the corresponding passageway 72 and through the corresponding furcation tube 90 at the same time. At this time, a first inspection may be performed to ensure that the optical fibers 34 disposed within the funnel area 46 are not twisted, overlapped, or excessively bent. Once the optical cable 32, heat shrink 60, optical fibers 34 and insert block 70 are properly positioned within the lower furcation body 40 with the furcation tubes 90 extending from the second end 35, the upper furcation body 50 is secured to the lower furcation body. In particular, the optical fiber ribbon 32 is placed between the lower ribbon guide 42 and the upper ribbon guide 52 and the upper furcation body 50 is lowered onto the lower furcation body 40 until the flexible locking latches 44 of the lower furcation body engage the corresponding recesses 54 of the upper furcation body. At this time, a second inspection may be performed to ensure that none of the optical fibers 34 disposed within the funnel area 46 are pinched between a guide wall 48 of the lower furcation body 40 and the underside of the upper furcation body 50. This inspection is possible due to the transparency of the upper furcation body 50 and the staggered array of passageways 72 of the insert block 70 which permits each of the optical fibers to be viewed from above without any optical fiber being obscured by another optical fiber as in existing fanout furcation kits.

Once the upper furcation body 50 is properly secured on the lower furcation body 40 with the multi-fiber optical cable 32 strain relieved and the individual optical fibers 34 smoothly transitioning between the heat shrink 60 and the insert block 70, the funnel area 46 of the assembled fanout furcation kit 30 is then filled with an epoxy or acrylate. In the embodiments shown and described herein, the epoxy or acrylate is introduced into the funnel area 46 through the fill port 56, for example via a conventional syringe (not shown). As previously described, the fill port 56 preferably is provided with a smaller diameter portion adjacent the underside of the upper furcation body 50 that defines a step to prevent the syringe from being inadvertently inserted through the fill port 56 into the funnel area 46 and possibly damaging an optical fiber 34. The epoxy or acrylate is introduced into the funnel area 46 such that it flows in the direction of the forward face 71 of the insert block and fully encapsulates the optical fibers 34 between the heat shrink 60 and the insert block. At this time, a third inspection may be performed to ensure that there are no voids in the epoxy or acrylate around an optical fiber 34 that could permit fiber movement within the funnel area 46, or that could expose the optical fiber to the ambient environment, thereby possibly resulting in increased attenuation (i.e., transmission loss) of the optical signal due to micro-bending or damage to the optical fiber. If the epoxy or acrylate is formulated with a fluorescent additive, this inspection may be enhanced utilizing a black light. Once the optical fibers 34 are fully encapsulated without voids, the epoxy or acrylate is then cured around the optical fibers. The processing time required to cure the epoxy or acrylate may be significantly reduced if the epoxy or acrylate is formulated to be cured utilizing an ultraviolet (UV) wavelength light source. Regardless, the epoxy or acrylate is cured until the specified time has elapsed or until an indicator, such as indicator 80 sensitive to ultraviolet wavelength light, indicates that the epoxy or acrylate is fully cured. At this time, a final inspection may be performed to ensure that no change to the positioning or the encapsulation of the optical fibers has occurred. Once again, this inspection may be enhanced utilizing a black light if the epoxy or acrylate is formulated with a fluorescent additive. Finally, one or more of the fully assembled and inspected fanout furcation kits 30 may be secured to an optical device or optical hardware utilizing through holes 92 and means for securing the fanout furcation kit, for example twist ties or zip ties (also commonly referred to as cable ties).

Alternatively, one or more of the fanout furcation kits 30 may be secured to an optical device or optical hardware utilizing the optional attachment wheels 94 having openings 95 for receiving fasteners. Thereafter, the optical fibers 34 encased for protection by the furcation tubes 90 may be terminated to one or more fiber optic connectors or optical devices in a conventional manner. Stacking multiple fanout furcation kits 30 and securing the fanout furcation kits together to an optical device or optical hardware utilizing the through holes 92 significantly increases the number and the density of optical fibers 34 available to be terminated.

Figure 7:
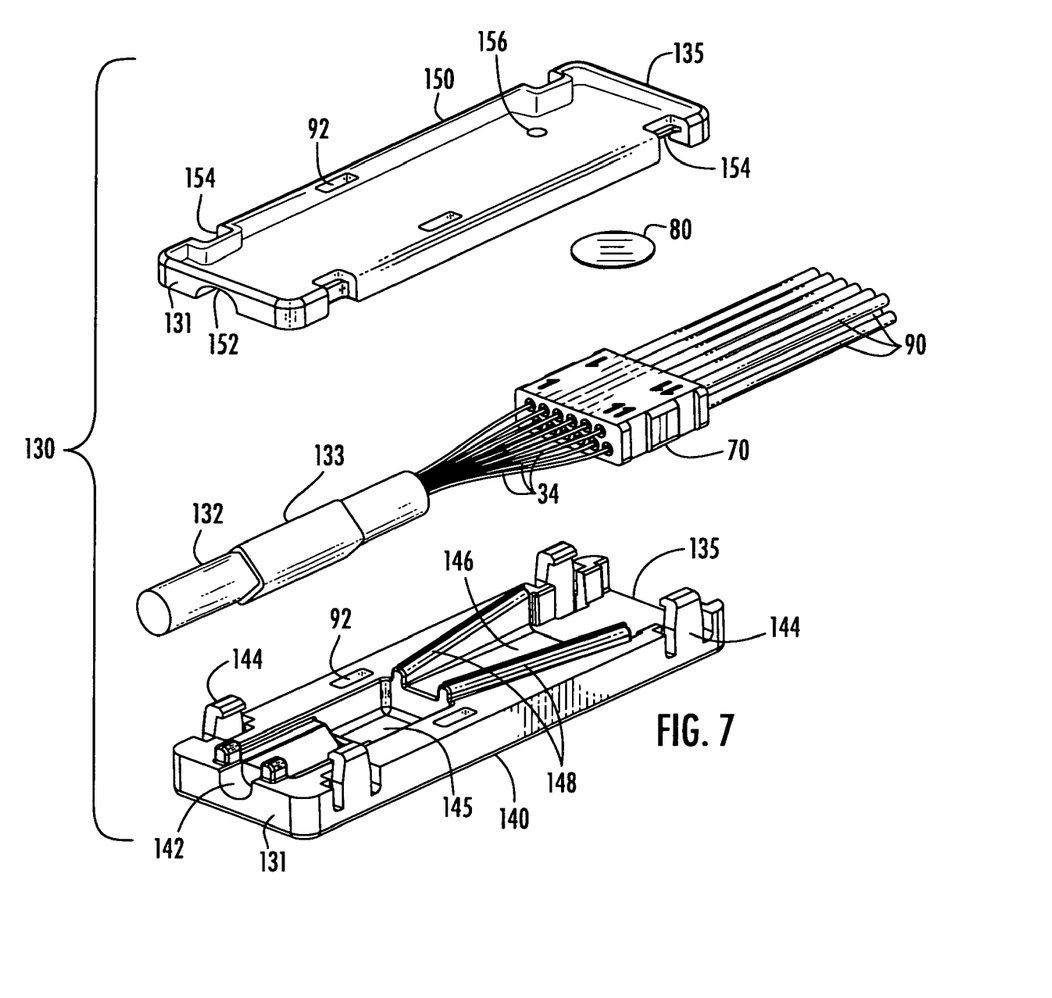
FIG. 7 is an exploded perspective view of another embodiment of a fanout furcation kit according to the present invention for use with a multi-fiber optical cable comprising a buffer tube.
Figure 8:
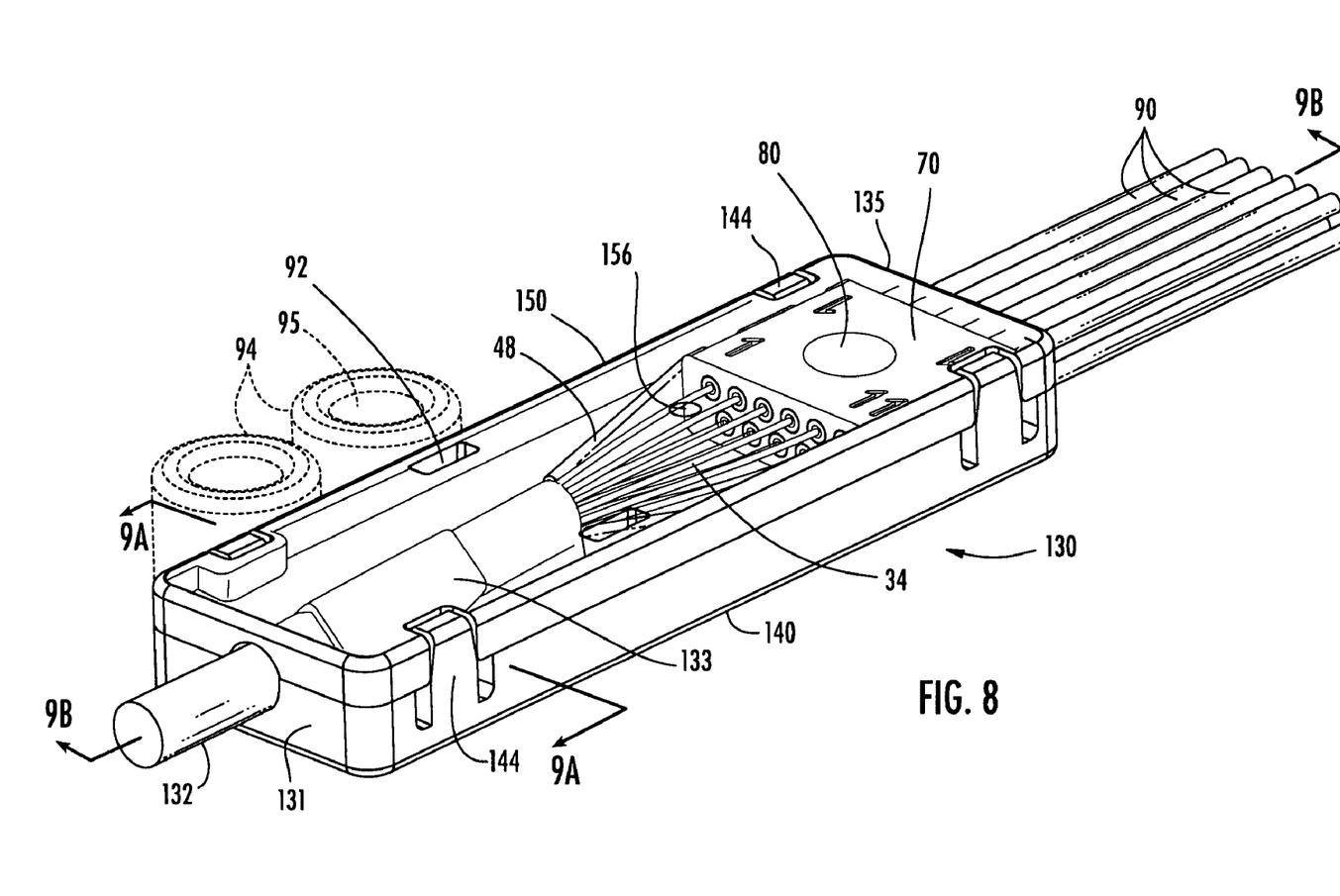
FIG. 8 is a perspective view of the fanout furcation kit of FIG. 7 shown fully assembled.
Figures 9A, 9B:
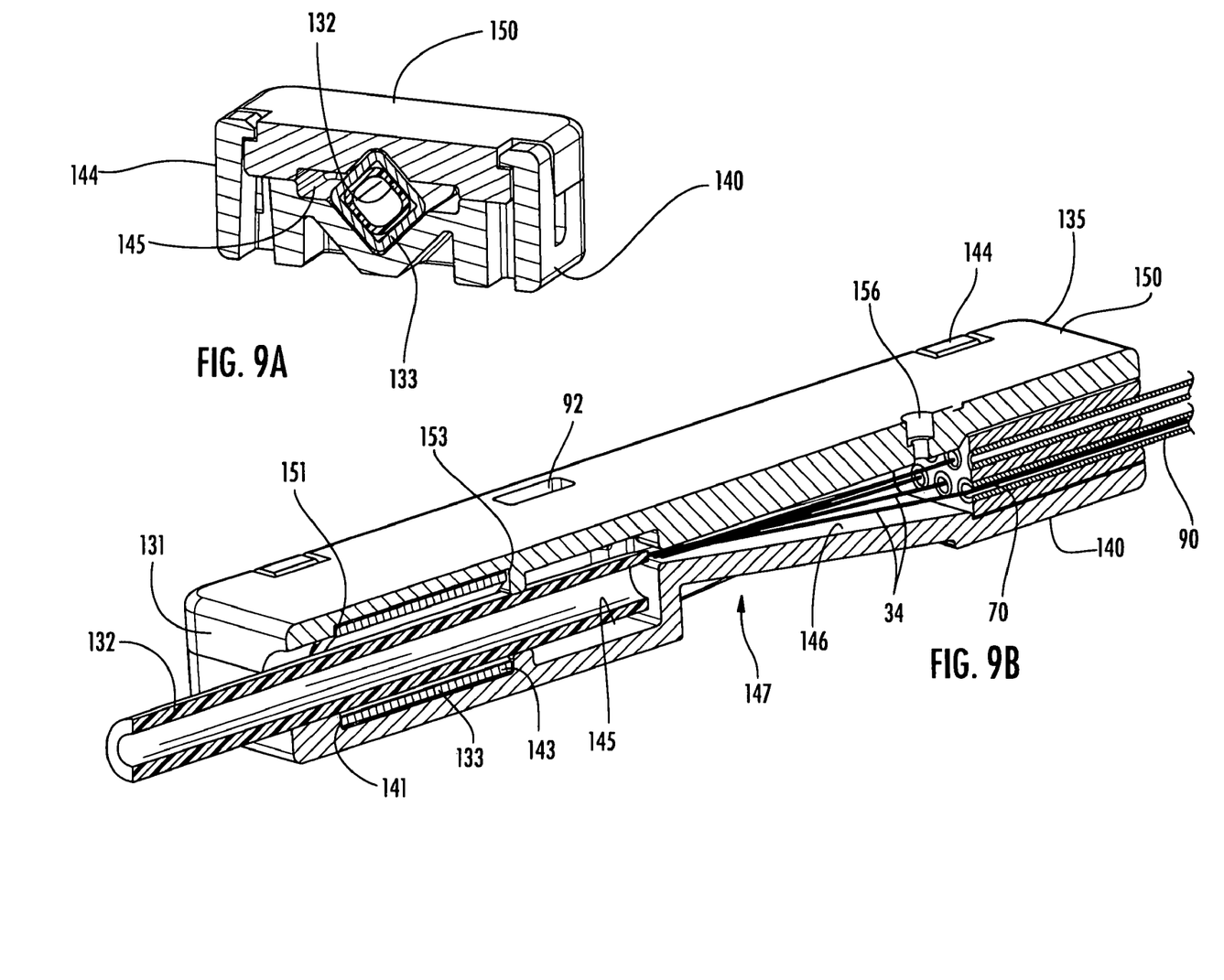
FIG. 9A is a lateral cross-section view of the assembled fanout furcation kit of FIG. 8 taken through the line indicated by 9A-9A.
FIG. 9B is a longitudinal cross-section view of the assembled fanout furcation kit of FIG. 8 taken through the line indicated by 9B-9B.

An alternative exemplary embodiment of a fanout furcation kit 130 according to the preset invention is shown in FIGS. 7-8. An exploded (i.e., unassembled) perspective view of the fanout furcation kit 130 is shown in FIG. 7, while a perspective view of the fanout furcation kit fully assembled is shown in FIG. 8. As shown, the fanout furcation kit 130 comprises a lower furcation body 140, an upper furcation body 150, an insert block 70 and an ultraviolet (UV) indicator 80 that is sensitive to ultraviolet (UV) wavelength light. The fanout furcation kit 130 receives a multi-fiber optical cable 132 adjacent a first end 131 of the fanout furcation kit 130 and separates the plurality of optical fibers of the multi-fiber optical cable 132 into individual optical fibers 34 encased within furcation tubing 90 adjacent a second end 135 of the fanout furcation kit.

Although not required, the furcation tubing 90 preferably is the furcation tubing 10, 20 described herein with reference to FIGS. 1A and 1B. In this manner, the fanout furcation kit 130 may obtain the additional benefits provided by the GF-PTFE furcation tubing 10 or the DLGF-PTFE furcation tubing 20 described hereinabove. The lower furcation body 140 and the upper furcation body 150 are essentially as previously described with the differences noted herein. The insert block 70, the optical fibers 34, the epoxy or acrylate, the indicator 80, the furcation tubing 90, the through holes 92 and the optional attachment wheels 94 associated with this alternative fanout furcation kit 130 are structurally and functionally identical to those previously described with reference to the fanout furcation kit 30. The primary difference between the fanout furcation kit 30 and the fanout furcation kit 130 is that the multi-fiber optical cable 132 comprises a buffer tube containing a plurality of optical fibers instead of an optical fiber ribbon. Accordingly, the embodiment of the fanout furcation kit 130 shown in FIGS. 7-8 is commonly referred to as a "Buffer fanout kit (BFK)" as opposed to the Ribbon fanout kit (RFK) previously described. The optical cable 132 may be a jacketed or unjacketed multi-fiber, loose-tube optical cable comprising at least one buffer tube as will be readily appreciated by those of ordinary skill in the art.

As best shown in FIG. 7, the fanout furcation kit 130 comprises an improved crimp assembly that positions and secures the multi-fiber optical cable 132 between the lower furcation body 140 and the upper furcation body 150. The crimp assembly serves to strain relieve the buffer tube of the optical cable 132 to the fanout furcation kit 130, thereby preventing the buffer tube from twisting and pistoning within the lead-in area 145 of the lower furcation body 140. In addition, the crimp assembly resists tensile cable-pull forces up to at least about 7.5 lbs., and more preferably, up to at least about 16 lbs. The crimp assembly is formed by a crimp tube 133 that initially has a generally round (i.e., circular) cross-section. The crimp tube 133 is threaded over the optical cable 132 and positioned around the buffer tube at the appropriate location with a sufficient portion of the buffer tube of the optical cable cut away and removed to expose the desired length of the individual optical fibers 34. The crimp tube 133 is then crimped (i.e., compressed) onto the buffer tube of the optical cable 132 by a crimp tool that re-shapes the crimp tube to have a generally square cross-section. The elongate, generally square crimp tube 133 is then positioned within the lead-in area 145 of the lower furcation body 140 between flats and mechanical stops 141, 143 formed in the upper surface of the lower furcation body and complimentary flats and mechanical stops 151, 153 formed in the lower surface (i.e., underside) of the upper furcation body 150. The flats and mechanical stops 141, 143, 151, 153 operate to prevent the crimp tube, and thus the optical cable 132, from twisting and/or pistoning once the upper furcation body 150 is secured on the lower furcation body. Furthermore, the lower furcation body 140 has a lower buffer tube guide 142 shaped and sized for supporting and guiding the optical cable 132 into the lead-in area 145. The upper furcation body 150 similarly has an upper buffer tube guide 152 shaped and sized to support and guide the optical cable 132 into the fanout furcation kit 130. The upper buffer tube guide 152 is positioned opposite the lower buffer tube guide 142 with the optical cable 132 disposed therebetween when the upper furcation body 150 is secured on the lower furcation body 140. The upper furcation body 150 is secured on the lower furcation body 140 utilizing flexible locking latches 144 and corresponding recesses 154 in the manner previously described with reference to the fanout furcation kit 30. The cut end of the buffer tube of the optical cable 132 is positioned against the forward edges of the guide walls 148 to form one of the four walls that define the funnel area 146 of the lower furcation body. Alternatively, a sealing insert (not shown) may be disposed around the optical fibers 34 and in sealing engagement with the forward edges of the guide walls 148 so as to ensure that the epoxy or acrylate does not flow out of the funnel area 146. With the exception of the crimp tube 133, the fanout furcation kit 130 is assembled and inspected in the manner previously described with respect to the fanout furcation kit 30. In particular, the optical fibers 34 are threaded through the inert block 70 and the furcation tubing 90, the insert block is secured within the lower furcation body 140, and the funnel area 146 is filled with the epoxy or acrylate through the fill port 156 of the upper furcation body 150 as previously described. The epoxy or acrylate is then cured so that the fanout furcation kit 130 may be secured to an optical device or optical hardware and the optical fibers 34 terminated to one or more fiber optic connectors or optical devices in a conventional manner.

The GF-PTFE furcation tubing 10 and the DLGF-PTFE furcation tubing 20 described herein provide reduced longitudinal shrinkage and increased tensile bond strength in the twelve standard colors utilized in the telecommunications industry for fiber identification. In particular, the furcation tubing 10, 20 has a lower CTE and higher tensile bond strength than existing furcation tubing made of a material consisting essentially of PVDF or a material consisting essentially of clear, etched Teflon (PTFE).

The fanout furcation kit 30 and the fanout furcation kit 130 described herein provide a Ribbon fanout kit (RFK) and Buffer fanout kit (BFK), respectively, that are more robust in some outdoor installations and do not permit fiber movement within the funnel area that may lead to unacceptable attenuation (i.e., transmission loss) of an optical signal as a result of micro-bending or damage to an optical fiber. The fanout furcation kits 30, 130 also provide improved process capabilities for separating optical fibers from a multi-fiber optical cable, such as an optical fiber ribbon or buffer tube, and reduced manufacturing and assembly times, along with generally enhanced mechanical strength and environmental performance in some outdoor installations.

The foregoing is a description of various embodiments of the invention that are given here by way of example only. Although furcation tubing and fanout furcation kits according to the present invention have been described with reference to preferred embodiments and examples thereof, other embodiments and examples may perform similar functions and/or achieve similar results. All such equivalent embodiments and examples are within the spirit and scope of the present invention and are intended to be covered by the appended claims.

That which is claimed is:

1. A ribbon fanout kit for separating an optical fiber ribbon comprising a plurality of optical fibers into individual optical fibers and protecting the individual optical fibers, the ribbon fanout kit comprising:

a lower furcation body having a lead-in area adjacent a first end and a funnel area disposed medially between the lead-in area and a second end, the optical fiber ribbon positioned within the lead-in area and the individual optical fibers positioned within the funnel area;

a heat shrink having a rearward face and a passageway therethrough for receiving the optical fiber ribbon, the heat shrink disposed about the optical fiber ribbon and positioned within the lead-in area of the lower furcation body;

an insert block having a forward face and a plurality of passageways therethrough for receiving the individual optical fibers, the insert block positioned within the lower furcation body between the funnel area and the second end, wherein the lower furcation body comprises a pair of upwardly projecting guide walls that are angled outwardly in the direction of the second end and wherein the funnel area is defined by the rearward face of the heat shrink, the forward face of the insert block and the guide walls; and an upper furcation body made of a generally transparent material and configured to be secured to the lower furcation body such that the individual optical fibers within the funnel area are visible through the upper furcation body.

2. A ribbon fanout kit according to claim 1, wherein the funnel area is generally bathtub shaped such that the funnel area has an increasing depth in the direction of the second end.

3. A ribbon fanout kit according to claim 1, wherein the passageways of the insert block are arranged in at least two spaced apart rows defining a staggered array.

4. A ribbon fanout kit according to claim 1, wherein the funnel area is filled with an acrylate having thixotropic properties that is cured by ultraviolet (UV) wavelength light.

5. The ribbon fanout kit according to claim 1, wherein the kit is a portion of a furcation assembly having a furcation tubing made of a material comprising glass-filled Teflon (PTFE).

6. The ribbon fanout kit according to claim 1, wherein the kit is a portion of a furcation assembly having furcation tubing, wherein the furcation tubing has an inner diameter and an outer diameter defining a first layer therebetween made of a material consisting essentially of Teflon (PTFE) and a second layer therebetween made of the material comprising glass-filled PTFE.

7. The ribbon fanout kit of claim 4, further comprising an indicator, wherein the indicator provides visual indication when the acrylate is cured.

* * * * *